United States Patent Office 3,714,177
Patented Jan. 30, 1973

3,714,177
**UREA DERIVATIVES OF 2-AMINOBENZO-
THIAZOLES**
John E. Engelhart, Westfield, N.J., assignor to Esso
Research and Engineering Company
No Drawing. Filed Apr. 9, 1970, Ser. No. 27,101
Int. Cl. C07d 91/46
U.S. Cl. 260—305                                    17 Claims

ABSTRACT OF THE DISCLOSURE

Compounds having the following structure:

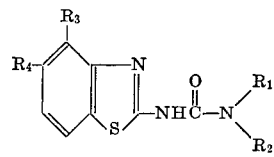

wherein $R_4$ may be hydrogen when $R_3$ is selected from the following: $C_1$ to $C_6$ straight or branched alkyl, $C_3$–$C_6$ alkenyl, $C_3$–$C_6$ alkynyl, $C_3$–$C_8$ cycloalkyl, $C_1$–$C_6$ alkoxy, $C_1$–$C_6$ alkylthio, $C_1$–$C_8$ mono- or $C_2$–$C_8$ dialkylamino, $C_1$–$C_4$ alkylsulfoxy, $C_1$–$C_4$ alkylsulfone. These groups may be optionally substituted by halogen, $C_1$–$C_4$ alkoxy, $C_1$–$C_4$ alkylthio, cyano or nitro. In addition, $R_3$ may also be selected from the following: fluoro, chloro, bromo, hydroxy, cyano, amino, mercapto, or perhaloalkyl. When $R_4$ is not hydrogen, it may be the same or different than $R_3$ and may be one of the groups enumerated above for $R_3$. For the purpose of this invention $R_1$ and $R_2$ are selected from the following groups, $C_1$–$C_6$ straight or branched alkyl, $C_3$–$C_6$ alkenyl, $C_3$–$C_6$ alkynyl, $C_1$–$C_6$ alkoxy or $C_3$–$C_8$ cycloalkyl. These groups may be optionally substituted by halogen, $C_1$–$C_4$ alkoxy, $C_1$–$C_4$ alkylthio, cyano, or nitro. In addition, $R_1$ and $R_2$ may comprise together a ring from 3 to 8 atoms.

---

This invention relates to novel, herbicidally effective compounds. In one aspect, this invention relates to urea derivatives of 2-aminobenzothiazoles. In another aspect, this invention relates to derivatives of 2-aminobenzothiazoles as post-emergent herbicides.

It has been previously described in German Pat. No. 1,204,015, issued to Farbenfabriken Bayer Aktiengesellschaft Company that substituted thio ureas having the formula:

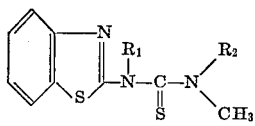

in which $R_1$ and $R_2$ stand for hydrogen or an alkyl radical with 1 to 2 carbon atoms, possess herbicidal activity.

It is also known that Farbenfabriken Bayer Aktiengesellschaft has developed substituted amides of the formula:

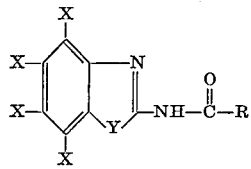

wherein X represents hydrogen, halogen and an alkyl group having 1 to 2 carbon atoms; R represents hydrogen, an aliphatic group containing 1–6 carbon atoms and having halogen or alkoxy substituted therein; and Y represents either oxygen or sulfur, possess herbicidal activity. These compounds are described in French Pat. 1,372,103 assigned to Farbenfabriken Bayer Aktiengesellschaft.

In addition, E. I. du Pont de Nemours & Company of Wilmington, Del. has disclosed in U.S. Pat. No. 2,756,135 compounds represented by the following formula:

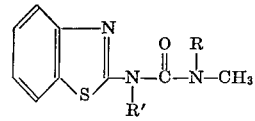

wherein R is hydrogen or a monovalent aliphatic hydrocarbon radical of less than 5 carbon atoms and R' is hydrogen or methyl. These compounds are claimed as herbicides.

Consequently, it is observed that certain benzothiazole amides and ureas have herbicidal activity and that the art is constantly looking for new compounds which display crop tolerance in this area.

The herbicidally active compounds of the subject invention are derivatives of 2-aminobenzothiazoles and more particularly, the compounds of the invention are represented by the following formula:

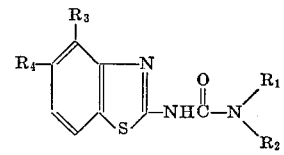

wherein $R_4$ may be hydrogen when $R_3$ is selected from the following: $C_1$ to $C_6$ straight or branched alkyl, $C_3$–$C_6$ alkenyl, $C_3$–$C_6$ alkynyl, $C_3$–$C_8$ cycloalkyl, $C_1$–$C_6$ alkoxy, $C_1$–$C_6$ alkylthio, $C_1$–$C_8$ mono- or $C_2$–$C_8$ dialkylamino, $C_1$–$C_4$ alkylsulfoxy, $C_1$–$C_4$ alkylsulfone. These groups may be optionally substituted by halogen, $C_1$–$C_4$ alkoxy, $C_1$–$C_4$ alkylthio, cyano or nitro. In addition, $R_3$ may also be selected from the following: fluoro, chloro, bromo, hydroxy, cyano, amino, mercapto, or perhaloalkyl. When $R_4$ is not hydrogen, it may be the same or different than $R_3$ and may be one of the groups enumerated above for $R_3$. For the purpose of this invention $R_1$ and $R_2$ are selected from the following groups, $C_1$–$C_6$ straight or branched alkyl, $C_3$–$C_6$ alkenyl, $C_3$–$C_6$ alkynyl, $C_1$–$C_6$ alkoxy or $C_3$–$C_8$ cycloalkyl. These groups may be optionally substituted by halogen, $C_1$–$C_4$ alkoxy, $C_1$–$C_4$ alkylthio, cyano or nitro. In addition, $R_1$ and $R_2$ may comprise together a ring from 3 to 8 atoms.

These compounds are unique in that if a substituent is positioned at the 4-position on the benzene ring, the compounds exhibit excellent herbicidal properties and in fact do demonstrate crop tolerance. Likewise, if substituents are present at the 4 and 5 position, the compounds have excellent herbicidal properties together with crop tolerance. However, if the substituent is positioned at the 5 position only, good herbicidal activity but poor crop tolerance results. If the R group is positioned in the 6 or 7 positions, there is little or no herbicidal activity. This action is completely unexpected in view of the fact that in the above-described prior art, the substituted amides show that one should expect good activity with a substituent group on any or all positions on the benzene ring.

It is not obvious from the prior art that compounds with substituents on the 4 or the 4 and 5 positions on the ring would possess excellent herbicidal activity while exhibiting outstanding tolerance to certain crops.

When the active compounds are applied for weed control in cotton fields, genuine selectivity occurs. Even at rates of application much higher than needed to control or destroy mature weeds there is no adverse effect to the cotton plants. However, if the substituents on the ring system are in the 6 or 7 positions, all selectivity and/or activity ceases. Exemplary of compounds falling within the scope of the structure set forth hereinabove are as follows:

| Compound No. | |
|---|---|
| 1 | 1,1-dimethyl-3-(4-methyl-2-benzothiazolyl)urea. |
| 2 | 1,1-dimethyl-3-(4-ethyl-2-benzothiazolyl)urea. |
| 3 | 1,1-dimethyl-3-(4-methoxy-2-benzothiazolyl)urea. |
| 4 | 1,1-dimethyl-3-(4-ethoxy-2-benzothiazolyl)urea. |
| 5 | 1,1-dimethyl-3-(4-n-propyl-2-benzothiazolyl)urea. |
| 6 | 1,1-dimethyl-3-(4-isopropyl-2-benzothiazolyl)urea. |
| 7 | 1,1-dimethyl-3-(4-n-butyl-2-benzothiazolyl)urea. |
| 8 | 1,1-dimethyl-3-(4,5-dimethyl-2-benzothiazolyl)urea. |
| 9 | 1,1-dimethyl-3-(4-chlorobenzothiazolyl)urea. |
| 10 | 1,1-dimethyl-3-(4-methyl-5-chloro-2-benzothiazolyl)urea. |
| 11 | 1,1-dimethyl-3-(4,5-dimethoxy-2-benzothiazolyl)urea. |
| 12 | 1,1-dimethyl-3-(4-trifluoromethyl-2-benzothiazolyl)urea. |
| 13 | 1,1-dimethyl-3-(4-fluoro-2-benzothiazolyl)urea. |
| 14 | 1,1-dimethyl-3-(4-methylthio-2-benzothiazolyl)urea. |
| 15 | 1,1-dimethyl-3-(4-cyano-2-benzothiazolyl)urea. |
| 16 | 1,1-dimethyl-3-(4-bromo-2-benzothiazolyl)urea. |
| 17 | 1,1-dimethyl-3-(4-dimethylamino-2-benzothiazolyl)urea. |
| 18 | 1,1-dimethyl-3-(4-hydroxy-2-benzothiazolyl)urea. |
| 19 | 1,1-dimethyl-3-(4-ethyl-5-methyl-2-benzothiazolyl)urea. |
| 20 | 1,1-diethyl-3-(4-methyl-2-benzothiazolyl)urea. |
| 21 | 1,1-diethyl-3-(4-ethyl-2-benzothiazolyl)urea. |
| 22 | 1,1-diethyl-3-(4-methoxy-2-benzothiazolyl)urea. |
| 23 | 1-methyl-1-methoxy-3-(4-methyl-2-benzothiazolyl)urea. |
| 24 | 1-methyl-1-methoxy-3-(4-methoxy-2-benzothiazolyl)urea. |
| 25 | 1-methyl-1-methoxy-3-(4-ethyl-2-benzothiazolyl)urea. |
| 26 | 1-methyl-1-methoxy-3-(4,5-dimethyl-2-benzothiazolyl urea. |
| 27 | 1-methyl-1-butyl-3-(4-methyl-2-benzothiazolyl)urea. |

The compounds of this invention can be prepared by well-known methods, examples of which are outlined schematically as follows:

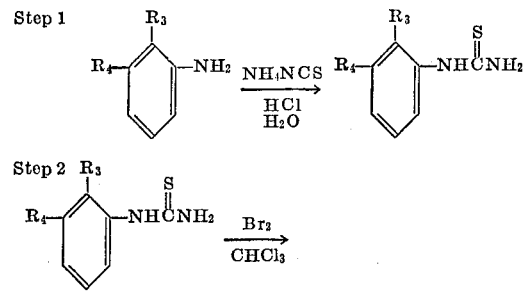

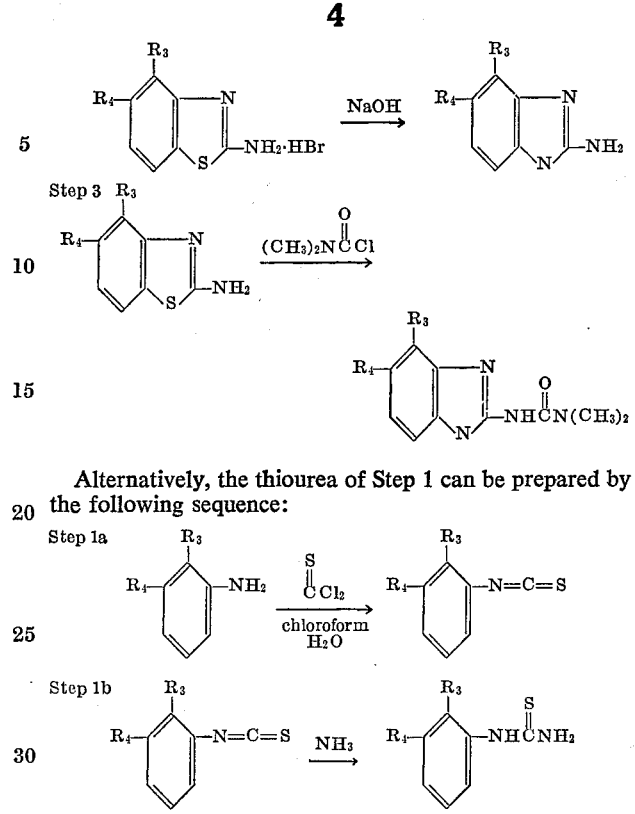

Alternatively, the thiourea of Step 1 can be prepared by the following sequence:

The ureas of Step 3 can also be prepared by alternate routes as follows:

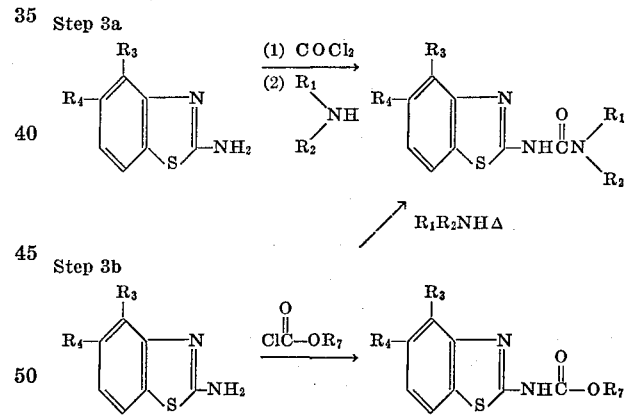

wherein $R_7$ is a lower alkyl group of $C_1$–$C_4$ and $R_1$, $R_2$, $R_3$ and/or $R_4$ are the same as defined previously.

REACTION CONDITIONS FOR SYNTHESIZING COMPOUNDS OF THE INVENTION

| Step | Starting material | Preferred reagents | Alternate reagents | Solvents | Preferred temp. (temp. range), °C. | Pressure |
|---|---|---|---|---|---|---|
| 1 | 1 mole, substituted aniline | 1–2 moles ammonium thiocyanate, 1 mole HCl. | KSCN, NaSCN; $H_2SO_4$. | Water; nonprotic solvents | 25–150 | Atmospheric to 10 atm. |
| 2 | Thiourea 1 mole | Bromine 1 mole | $SO_2Cl_2$, $Cl_2$ | Chloroform or other nonprotic solvent. | −20–100 | Atmospheric. |
| 3 [1] | Substituted 2-aminobenzothiazole 1 mole. | 1–1.5 moles dimethyl carbamoylchloride. | Other carbamoyl halides. | Pyridines or non-protic solvent. | −20–100 | Do. |
| 1a–1b | 1 mole, substituted aniline | 1 mole thiophosgene, 2–10 moles ammonia. | | Water, chloroform | −5–50 | Do. |
| 3a | 1 mole, substituted 2-aminobenzothiazole. | 1 mole phosgene, 1–10 moles dimethylamine. | Other secondary amines. | Benzene, other non-protic solvents. | 0–100 | Atmospheric to 10 atm. |
| 3b [1] | Substituted 2-aminobenzothiazole 1 mole. | 1–1.5 moles alkyl chloroformate, 1–10 moles dimethylamine. | do | do | 25–200 | Atmospheric to 100 atm. |

[1] Acid acceptor needed for optimal results.

The 2-aminobenzothiazole derivatives of the invention have general herbicidal properties. They are especially useful in certain types of weed control, such as for example, an application to crop lands to give control of the common weeds without harming the crop plants, particularly cotton.

The herbicidal compositions of the invention are prepared by mixing one or more of the 2-aminobenzothiazoles defined hereinabove in herbicidally effective amounts with a conditioning agent of the kind used and referred to in the art as a pest control adjuvant or modifier to provide formulations adapted for ready and efficient application to weeds (i.e. unwanted plants) using conventional applicator equipment.

Thus, the herbicidal compositions or formulations are prepared in the form of solids or liquids. Solid compositions are preferably in the form of wettable powder or dust and are compounded to give homogeneous free-flowing dust by admixing the active compound or compounds with finely divided solids, preferably talcs, natural clays, pyrophylite, diatomaceous earth, or flowers, such as walnut shell, wheat, redwood, soya bean, cottonseed flowers, and other inert solid conditioning agents or carriers of the kind conventionally employed in preparing pest control compositions in dust or powdered forms.

Liquid compositions of the invention are prepared in the usual way by admixing one or more of the 2-aminobenzothiazoles with a suitable liquid diluent medium. With certain solvents, such as alkylated naphthalene, dimethylformamide, and cresol, relatively high concentrations of the ureas can be obtained in suspension or solution.

The herbicidal compositions of the invention, whether in the form of dust or liquids, preferably also include a surface active agent, sometimes referred to in the art as a wetting, dispersing or emulsifying agent. These agents, which will be referred to hereinafter more simply as surface-active dispersing agents cause the compositions to be easily dispersed in water to give aqueous sprays which for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonate animal and vegetable oils, such as sulfonated fish and castor oils, sulfonated petroleum oils, sulfonated acyclic hydrocarbons, sodium salt of lignin sulfonic acid (goulac), alkyl naphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerolmonostearate, diglycol oleate, polyethylene oxides, ethyl oxide condensation products with stearyl alcohol and octylphenol, polyvinyl alcohols, salts, such as the acetate of polyamines from reductive amination of ethylene-carbon monoxide polymers, lauryl amine hydrochloride, lauryl piperidinium bromide, stearyltrimethylammonium bromide, cetyldimethylbenzyl ammonium chloride, lauryl dimethyl amine oxide, and the like. Generally, the surface-active agent will not comprise more than about 5 to 15% by weight of the composition and in certain compositions the percentages will be 1% or less. Usually, the minimum lower concentration will be 0.1%.

The herbicidal compositions are applied either as a spray or a dust to the location to be protected from undesirable plant growth, commonly called weeds, i.e., plants growing where they are not wanted. Such application can be made directly upon the area and the weeds thereon, during the period of weed infestation in order to destroy the weeds. Thus, the compositions can be applied as aqueous foliar sprays, and alternatively, the dry powder composition can be dusted directly on the plants.

In applying the herbicidal compositions of the invention for selective weed control as in the control of weeds in cotton or corn fields, the compositions are preferably applied after emergence of the seedlings. In other words, the applications are of the post-emergence type.

The active compound is, of course, applied in an amount sufficient to exert the desired herbicidal action. The amount of the active compound present in the compositions as usually applied for destroying or preventing weeds will vary with the manner of application, the particular weed for which control is sought, the purpose for which the application is being made and like variables. In general, the herbicidal composition as applied in the form of a spray or a dust, will contain from about 0.5% to 90% by weight of the 2-aminobenzothiazole derivative.

Fertilizer materials, other herbicidal agents and other pest control agents, such as insecticides and fungicides can be included in herbicidal compositions of the invention if desired.

In order that the invention may be better understood, the following examples are given in addition to the examples already given hereinabove. The examples illustrate a method for making compounds of the invention, herbicidal formulations employing such compounds, herbicidal applications and the results obtained. Parts are by weight unless otherwise specified in the examples, and the numbers following tabulated ingredients in the examples represent parts by weight of the ingredients of such compositions.

EXAMPLE 1

Preparation of 2-amino-4-methylbenzothiazole

Into a 500 ml. 4-necked flask equipped with magnetic stirrer, condenser, thermometer and additional funnel, was added 16.6 g. (0.1 mole) o-tolylthiourea and 100 ml. chloroform. To this mixture was added over a 25 minute period, 16.0 g. (0.1 mole) bromine dissolved in 50 ml. chloroform during which time the temperature rose to 42° C. The solution was then heated to reflux for three hours, cooled and filtered to yield 12.2 g. of hydrobromide salt. The salt was digested with 100 ml. 10% sodium bisulfite for 30 minutes on a steam bath and then made basic with 10% sodium hydroxide solution. After cooling, the white granular solid was filtered to yield 9.7 g. of the title compound, M.P. 135.5–137°.

EXAMPLE 2

Preparation of 1,1-dimethyl-3-(4-methyl-2-benzothiazolyl)urea

Into a 250 ml. flask equipped with magnetic stirrer, condenser, thermometer and addition funnel, was added 50 ml. pyridine and then cooled to 5° C. To the pyridine was added dropwise 8.9 g. (0.083 mole) dimethylcarbamoyl chloride and, in small batches, 12.3 g. of 2-amino-4-methylbenzothiazole, keeping the temperature below 15°. After stirring at room temperature for one hour, the mixture was heated at 70° for 20 minutes, cooled, and poured into 200 ml. of water. The solid product was filtered and dried in vacuo to yield 15.5 g. of white granular solid, M.P. 168–174.5°. Recrystallization from benzene yielded colorless crystals, M.P. 176.5–178°.

Calculated for $C_{11}H_{13}N_3OS$ (percent): C, 56.3; H, 5.53; N, 17.85. Found (percent): C, 56.8; H, 5.70; N, 17.70. The structure was confirmed by NMR and IR.

EXAMPLE 3

Preparation of 1,1-dimethyl-3-(4-ethyl-2-benzothiazolyl)urea

Utilizing the procedure of Example 2, 10.5 g. of urea 2 was prepared from 8.5 g. (0.05 mole) 2-amino-4-ethylbenzothiazole. Recrystallization from benzene yielded product of M.P. 158–160°.

Calculated for $C_{12}H_{15}N_3OS$ (percent): C, 57.8; H, 6.02; N, 16.8. Found (percent): C, 57.2; H, 6.06; N, 16.1.

EXAMPLE 4

Preparation of 1,1-dimethyl-3-(4-methoxy-2-benzothiazolyl)urea

Utilizing the procedure of Example 2, 8.8 g. of urea 3 as a dihydrate was prepared from 9.0 g. (0.05 mole) of 2-amino-4-methoxybenzothiazole, M.P. 101–105.5°.

Calculated for $C_{11}H_{13}N_3O_2S \cdot 2H_2O$ (percent): C, 46.0; H, 5.93; N, 14.7. Found (percent): C, 46.2; H, 6.02; N, 14.7.

EXAMPLE 5

Preparation of 1,1-dimethyl-3-(4,5-dimethyl-2-benzothiazolyl)urea

Utilizing the procedure of Example 2, 3 g. of urea 8 were prepared from 6.6 g. (0.037 mole) 2-amino-4,5-dimethylbenzothiazole, M.P. 149.5–151°.

Calculated for $C_{12}H_{15}N_3OS$ (percent): C, 57.8; H, 6.03; N, 16.8. Found (percent): C, 56.4; H, 5.86 N, 16.0.

EXAMPLE 6

Preparation of 1,1-dimethyl-3-(4-chlorobenzothiazolyl)urea

Utilizing the procedure of Example 2, 17.8 g. of urea 9 were prepared from 18.5 g. (0.1 mole) of 2-amino-4-chlorobenzothiazole, M.P. 177–183°.

Calculated for $C_{10}H_{10}ClN_3OS$ (percent): C, 46.8; H, 3.91; N, 16.4. Found (percent): C, 46.2; H, 3.42; N, 15.8.

EXAMPLE 7

Preparation of an 80% wettable powder formulation of 1,1-dimethyl-3-(4-methyl-2-benzothiazolyl)urea 85% of 1,1 - dimethyl - 3-(4-methyl-2-benzothiazolyl) urea (95% purity), 5% of a complex polymerized organic salt of a sulfonic acid of the alkyl aryl type known as Darvan I and manufactured by the R. T. Vanderbilt Chemical Company of 230 Park Avenue, New York, 6% of sodium alkyl naphthalene sulfonate known as Nekal BX78 manufactured by the Antera Division of General Aniline and Film Co., and 4% of a hydrated silica known as Hi-Sil 233, manufactured by the Pittsburgh Plate Glass Company, were blended together and the mixture ground to an average particle size of 5 to 10 microns.

EXAMPLE 8

Representative benzothiazole urea derivatives from those prepared in the previous examples were evaluated for post-emergent herbicidal activity in this example. The test procedure employed was as follows:

Two flats seeded with six crops (cotton, soybean, alfalfa, corn, rice and oats) and six weeds (mustard, morning glory, zinnia, crabgrass, barnyard grass and foxtail) were sprayed with a formulation containing the test chemical and acetone as solvent, at a series of rates beginning at ten pounds per acre. The flats were then held in the greenhouse and a response rated after 12 to 16 days. The response was rated by a scale of 0 to 10. (The 0–10 scale is defined as follows:)

0 = no injury
1–3 = slight injury
4–6 = moderate injury, plants may die
7–9 = severe injury, plants will probably die
10 = all plants dead (complete kill)

In order to prove the criticality of the positioning of our substituents on the rings, the following compounds were compared with the compounds of the subject invention. These compounds neither constitute a part of this patent's disclosure nor are encompassed in the claimed subject matter.

| Compound No. | |
|---|---|
| 28 | 1,1-dimethyl-3-(2-benzothiazolyl)urea. |
| 29 | 1,1-dimethyl-3-(5-methyl-2-benzothiazolyl)urea. |
| 30 | 1,3-dimethyl-3-(4-methoxy-2-benzothiazolyl)urea. |
| 31 | 1,3-dimethyl-3-(2-benzothiazolyl)urea. |
| 32 | 1,1-dimethyl-3-(4,7-dimethyl-2-benzothiazolyl) urea. |
| 33 | 1,1-dimethyl-3-(4-methyl-7-chloro-2-benzothiazolyl)urea. |
| 34 | 1,1-dimethyl-3-(6-methoxy-2-benzothiazolyl)urea. |

Table I illustrates the unique cotton tolerance of Compounds 1, 2, 3 vs. the analogous, patented Compound 28, which shows no cotton tolerance.

Table II shows the effect of moving a functional group outside the area of this patent. The 5-methyl derivative, Compound 29, shows no cotton tolerance whereas the 4-methyl isomer, Compound 1, claimed in the subject application is a selective herbicide. Likewise, the 1,3-dimethyl urea, Compound 30, shows no cotton tolerance shown by 1,1-dimethyl isomer, Compound 3, also claimed in the subject application. Compounds 32 and 33, the 4,7-disubstituted isomers, as well as the 6-substituted type, Compound 34, show no herbicidal character even at the 5 or 10 lb./acre application rate.

Table III dramatically illustrates the unique degree of cotton tolerance exhibited by compounds of this invention, namely Compounds 1 and 3 in this case. The complete lack of cotton tolerance of the previously patented Compound 28 is also vividly demonstrated. The lack of injury to cotton even at the extremely high rate of 32 lbs./acre with Compounds 1 and 3 points to the utility of these new compounds.

TABLE I.—BENZOTHIAZOLE UREAS

| Compound | Rate, lb./a. | Barnyard grass | Crab grass | Foxtail | Zinnia | Mustard | Morning glory | Cotton | Soybean | Alfalfa | Corn | Rice | Oats |
|---|---|---|---|---|---|---|---|---|---|---|---|---|---|
| Post-emergence |||||||||||||||
| 1 | 10 | 10 | 9 | 10 | 10 | 10 | 10 | 0 | 10 | 9 | 5 | 6 | 6 |
| 2 | 10 | 9 | 10 | 10 | 10 | 10 | 10 | 1 | | | | | |
| 3 | 10 | 10 | 10 | 10 | 10 | 10 | 10 | 1 | 10 | 7 | 7 | 9 | 5 |
| 28 | 10 | 10 | 10 | 10 | 10 | 10 | 10 | 5 | 10 | 10 | 9 | 9 | 8 |
| Test 2 |||||||||||||||
| 1 | 4 | 10 | 10 | 10 | 10 | 10 | 10 | 0 | 9 | 10 | 7 | 8 | |
| 2 | 4 | 10 | 10 | 10 | 10 | 10 | 10 | 0 | 5 | 9 | 10 | 6 | |
| 3 | 4 | 10 | 10 | 10 | 10 | 9 | 10 | 1 | 10 | 6 | 4 | 6 | |
| 28 | 4 | 9 | 10 | 10 | 10 | 10 | 7 | 6 | 8 | 8 | 5 | 9 | |

TABLE II.—BENZOTHIAZOLE UREAS

| Compound | Rate, lb./a. | Barnyard grass | Crab grass | Foxtail | Zinnia | Mustard | Cotton | Soybean | Alfalfa | Corn | Rice | Oats | Morning glory |
|---|---|---|---|---|---|---|---|---|---|---|---|---|---|
| 1 | 5 | 10 | 9 | 10 | 10 | 10 | 0 | 9 | 9 | 5 | 3 | 3 | 9 |
| 29 | 5 | 10 | 8 | 10 | 10 | 9 | 10 | 10 | 10 | 10 | 6 | 6 | 10 |
| 30 | 5 | 10 | 10 | 10 | 10 | 10 | 10 | 10 | 10 | 9 | 9 | 9 | 10 |
| 3 | 5 | 10 | 10 | 10 | 10 | 10 | 1 | 10 | 6 | 7 | 8 | 5 | 10 |
| 32 | 10 | 2 | 2 | 1 | 2 | 1 | 0 | 0 | 2 | 0 | 0 | 0 | 0 |
| 33 | 10 | 1 | 2 | 2 | 4 | 4 | 0 | 0 | 0 | 0 | 0 | 0 | 4 |
| 34 | 5 | 1 | 2 | 2 | 4 | 4 | 1 | 2 | 6 | 1 | 1 | 1 | 3 |

TABLE III.—POST EMERGENCE DATA

| Compound | Conc., lb./a. | Cotton A | Cotton B | Barnyard grass A | Barnyard grass B | Morning glory A | Morning glory B |
|---|---|---|---|---|---|---|---|
| 28 | 32 | 10 | 0 | 10 | 0 | 10 | 0 |
|  | 16 | 9 | .32 | 10 | 0 | 10 | 0 |
|  | 8 | 9 | .36 | 10 | 0 | 10 | 0 |
|  | 4 | 7 | 1.03 | 10 | 0 | 10 | 0 |
| 1 | 32 | 3 | 3.21 | 10 | 0 | 10 | 0 |
|  | 16 | 1 | 3.47 | 10 | 0 | 10 | 0 |
|  | 8 | 1 | 4.09 | 10 | 0 | 10 | 0 |
|  | 4 | 1 | 4.54 | 10 | 0 | 10 | 0 |
| 3 | 32 | 2 | 2.90 | 10 | 0 | 10 | ------ |
|  | 16 | 2 | 3.50 | 10 | 0 | 10 | ------ |
|  | 8 | 1 | 3.95 | 10 | 0 | 10 | ------ |
|  | 4 | 1 | 4.15 | 10 | 0 | 10 | ------ |

NOTE.—Column A=Phytotoxicity rating; Column B=Harvested fresh weight of crop or weed (in grams).

What is claimed is:

1. Compounds of the formula

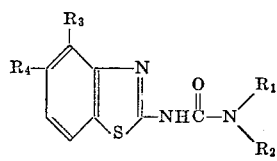

wherein $R_1$ represents $C_1$–$C_4$ alkyl; $R_2$ represents $C_1$–$C_4$ alkyl or $C_1$–$C_4$ alkoxy; $R_3$ represents $C_1$–$C_4$ alkyl, $C_1$–$C_4$ alkoxy, $C_1$–$C_4$ alkylthio, fluorine, chlorine, bromine, trifluoromethyl, or cyano; and $R_4$ represents hydrogen, $C_1$–$C_4$ alkyl, $C_1$–$C_4$ alkoxy, or chlorine.

2. A compound according to claim 1 which is, 1,1-dimethyl-3-(4-methyl-2-benzothiazolyl)urea.

3. A compound according to claim 1 which is, 1,1-dimethyl-3-(4-ethyl-2-benzothiazolyl)urea.

4. A compound according to claim 1 which is, 1,1-dimethyl-3-(4-methoxy-2-benzothiazolyl)urea.

5. A compound according to claim 1 which is, 1,1-dimethyl-3-(4-ethoxy-2-benzothiazolyl)urea.

6. A compound according to claim 1 which is, 1,1-dimethyl-3-(4-n-propyl-2-benzothiazolyl)urea.

7. A compound according to claim 1 which is, 1,1-dimethyl-3-(4-isopropyl-2-benzothiazolyl)urea.

8. A compound according to claim 1 which is, 1,1-dimethyl-3-(4-n-butyl-2-benzothiazolyl)urea.

9. A compound according to claim 1 which is, 1,1-dimethyl-3-(4,5-dimethyl-2-benzothiazolyl)urea.

10. A compound according to claim 1 which is, 1,1-dimethyl-3-(4-chlorobenzothiazolyl)urea.

11. A compound according to claim 1 which is, 1,1-dimethyl-3-(4-methyl-5-chloro-2-benzothiazolyl)urea.

12. A compound according to claim 1 which is, 1,1-dimethyl-3-(4,5-dimethoxy-2-benzothiazolyl)urea.

13. A compound according to claim 1 which is, 1,1-dimethyl-3-(4-trifluoromethyl-2-benzothiazolyl)urea.

14. A compound according to claim 1 which is, 1,1-dimethyl-3-(4-fluoro-2-benzothiazolyl)urea.

15. A compound according to claim 1 which is, 1,1-dimethyl-3-(4-methylthio-2-benzothiazolyl)urea.

16. A compound according to claim 1 which is, 1,1-dimethyl-3-(4-cyano-2-benzothiozolyl)urea.

17. A compound according to claim 1 which is, 1,1-dimethyl-3-(4-bromo-2-benzothiazolyl)urea.

References Cited

UNITED STATES PATENTS 2,756,135   7/1956   Searle _____ 260—305
3,551,441   12/1970  Zakaria _____ 260—305

OTHER REFERENCES

Fujikawa et al., Chem. Abstracts, 70:77857n (1969).
Moore, Chem. Abstracts, 67:64387x (1967).

ALEX MAZEL, Primary Examiner

R. J. GALLAGHER, Assistant Examiner

U.S. Cl. X.R.

71—91; 260—552 R